(12) United States Patent
Poznanski et al.

(10) Patent No.: US 6,397,174 B1
(45) Date of Patent: May 28, 2002

(54) METHOD OF AND APPARATUS FOR PROCESSING AN INPUT TEXT, METHOD OF AND APPARATUS FOR PERFORMING AN APPROXIMATE TRANSLATION AND STORAGE MEDIUM

(75) Inventors: Victor Poznanski, Sandford on Thames; Jan Jaap Ijdens, Gloucester Green; Peter John Whitelock, Botley, all of (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/237,772

(22) Filed: Jan. 26, 1999

(30) Foreign Application Priority Data

Jan. 30, 1998 (GB) .............................................. 9802141

(51) Int. Cl.$^7$ ............................................. G06F 17/27
(52) U.S. Cl. .......................................................... 704/9
(58) Field of Search ................... 704/1, 9, 10; 707/500, 707/530, 531, 3

(56) References Cited

U.S. PATENT DOCUMENTS 4,868,750 A * 9/1989 Kucera et al. ................. 704/9
5,200,893 A * 4/1993 Ozawa et al. .................. 704/9
5,383,120 A * 1/1995 Zernik ............................ 704/9
5,617,488 A * 4/1997 Hong et al. ................. 382/229
6,137,911 A * 10/2000 Zhilyaev ..................... 382/225

* cited by examiner

Primary Examiner—Patrick N. Edouard
(74) Attorney, Agent, or Firm—Renner, Otto, Boisselle & Sklar

(57) ABSTRACT

A method of processing an input text comprising a plurality of words is provided. The method comprising the steps of deriving from the input text a plurality of sets such that each set comprises at least one of the words of the input text, all of the words of each set are present in the input text, and the words of each if any set containing more than one word constitute a collocation; assigning to each set a unique relative rank; comparing each set in order of decreasing relative rank with the input text; and selecting each set, all of whose words are present in the input text and none of whose words is present in a previously selected set of higher relative rank.

36 Claims, 3 Drawing Sheets

METHOD OF AND APPARATUS FOR PROCESSING AN INPUT TEXT, METHOD OF AND APPARATUS FOR PERFORMING AN APPROXIMATE TRANSLATION AND STORAGE MEDIUM

TECHNICAL FIELD OF THE INVENTION

The present invention relates to a method of and an apparatus for processing an input text. The present invention also relates to a method of and an apparatus for performing an approximate translation. The invention further relates to a storage medium. Such methods and apparatuses may be used in natural language processing, document processing and text processing. For instance, such methods and apparatuses may be used as a glossing system which provides translations of words or groups of words in an input text into corresponding words or symbols or groups thereof in a different natural language.

DISCUSSION OF THE RELATED ART

Text in natural languages generally contains words or symbols which are associated with each other to have a meaning which is different from the individual meanings of the words or symbols. Such groups are referred to as "collocations" and must be identified as such if the text is to be processed correctly, for instance to access an index of a dictionary (monolingual, bilingual or multilingual), thesaurus or encyclopaedia.

There are known systems for analysing input text by parsing ie: analysing a sentence to determine the relationship between the words. The use of parsing is effective in optimally labelling a sentence with its collocations. However, this technique generally involves superfluous processing and is computationally complex. This technique also requires a vast amount of knowledge e.g. grammar rules and semantic constraints that related words exert upon each other, to drive it.

Another known technique finds the biggest continuous collocation, where "continuous" in this context means that the words of the collocation are adjacent to each other in the input text. However, such techniques cannot distinguish between collocations of the same length. For instance, in the sentence "Air passes out of the furnace through a pipe.", there are two collocations each having two words, namely "passes out" and "out of'. This technique cannot decide which of these collocations should be chosen.

A known technique for finding discontinuous collocations is disclosed in EP 0 637 805. This technique uses a part-of-speech tagger to attempt to select the best collocations from input text. Such a technique helps to distinguish between "bus stops" where "stops" is a noun, and "stops at" where "stops" is a verb in the sentence "the bus stops at Grenoble". However, this technique is not capable of indicating which of these possible collocations is optimal. Further, the technique does not provide a means for finding a consistent labelling of collocations for a sentence.

Although these techniques can determine without inconsistency collocations which do not share the same word from an input text, they cannot identify which is the optimal collocation where two or more possible collocations have one or more words in common. As the above examples illustrate, it is essential to select with a high degree of reliability the correct collocation if the collocation is required to be used, for instance to access an index such as a dictionary.

SUMMARY OF THE INVENTION

According to a first aspect of the invention, there is provided a method of processing an input text comprising a plurality of words, the method comprising the steps of:

deriving from the input text a plurality of sets such that each set comprises at least one of the words of the input text, all of the words of each set are present in the input text, and the words of each if any set containing more than one word constitute a collocation;

assigning to each set a unique relative rank;

comparing each set in order of decreasing relative rank with the input text; and selecting each set, all of whose words are present in the input text and none of whose words are present in a previously selected set of higher relative rank.

Each of the words of the input text may be present in at least one of the sets.

All of the words of the input text may be present in the union of the selected sets. The term "union" is used in its conventional mathematical sense and means a set containing all the words of the selected sets.

The input text may comprise a grammatically complete sample of text.

The words may comprise basic word forms derived from an original text by linguistic (e.g. morphological) analysis in a preliminary step.

The assigning step may comprise a first step of assigning a priority value which increases with increasing number of words in the set.

The assigning step may comprise a second step of assigning a priority value which decreases with increasing span of the words of the set in the input text. The term "span" means the number of words, including the words of the set themselves, between the word of the set which occurs first in the input text and the word of the set which occurs last in the input text.

The second step may be performed only if the first step results in more than one set having the same priority value.

The assigning step may comprise a third step of assigning a priority value which is dependent on the linguistic relationship between at least one word of the set and at least one word of the input text not in the set.

The third step may be performed only if the second step results in more than one set having the same priority value.

The assigning step may comprise a fourth step of assigning a priority value which increases with position to the right in the input text of the right-most word of the set. This is appropriate for languages such as English which tend to be right-branching.

The fourth step may be performed only if the third step results in more than one set having the same priority value.

The assigning step may comprise a fifth step of assigning a priority value by default.

The fifth step may be performed only if the fourth step results in more than one set having the same priority value.

The assigning step may comprise assigning a priority value based on a measure of probability of each set.

The method may comprise accessing an index of word sets with at least one of the selected sets.

According to a second aspect of the invention, there is provided a method of performing an approximate translation of an input text in a first natural language to a second natural language, comprising performing a method in accordance with the first aspect of the invention, in which the index is a dictionary, such as a bilingual dictionary, and outputting dictionary entries in the second language corresponding to the selected sets.

The first and second languages may be the same language but more usually are different languages.

According to a third aspect of the invention, there is provided an apparatus for processing an input text comprising a plurality of words, the apparatus comprising:

means for deriving from the input text a plurality of sets such that each set comprises at least one of the words of the input text, all of the words of each set are present in the input text, and the words of each if any set containing more than one word constitute a collocation;

means for assigning to each set a unique relative rank;

means for comparing each set in order of decreasing relative rank; with the input text; and means for selecting each set, all of whose words are present in the input text and none of whose words is present in a previously selected set of higher relative rank;.

The deriving means may be arranged such that each of the words of the input text is present in at least one of the sets.

The selecting means may be arranged such that all of the words of the input text are present in the union of the selected sets.

The input text may comprise a grammatically complete sample of text delimited by punctuation, such as full stops, semi-colons or colons. Examples of such samples are phrases, clauses and sentences.

The words may comprise basic word forms and the apparatus may comprise a linguistic analyser for analysing an original text and providing the basic word forms.

The assigning means may comprise first means for assigning a priority value which increases with increasing number of words in the set.

The assigning means may comprise second means for assigning a priority value which decreases with increasing span of the words of the set in the input text.

The second means may be enabled only if the first means assigns the same priority value to more than one set.

The assigning means may comprise third means for assigning a priority value which is dependent on the linguistic relationship between at least one word of the set and at least one word of the input text not in the set.

The third means may be enabled only if the second means assigns the same priority value to more than one set.

The assigning means may comprise fourth means for assigning a priority value which increases with position to the right in the input text of the right-most word of the set.

The fourth means may be enabled only if the third means assigns the same priority value to more than one set.

The assigning means may comprise fifth means for assigning a priority value by default.

The fifth means may be enabled only if the fourth means assigns the same priority value to more than one set.

The assigning means may be arranged to assign a priority value based on a measure of probability for each set.

The apparatus may comprise a store containing an index of word sets and means for accessing the index with at least one of the selected sets.

According to a fourth aspect of the invention, there is provided an apparatus for performing an approximate translation from an input text in a first natural language to a second natural language, comprising an apparatus in accordance with the third aspect of the invention, a store containing entries constituting a dictionary, and means for accessing the bilingual dictionary with at least one of the selected sets.

The apparatus according to the first or second aspect of the invention may comprise a programmed data processor.

According to a fifth aspect of the invention, there is provided a storage medium containing a program for a data processor of an apparatus according to the third or fourth aspect of the invention.

It is thus possible to provide a technique which allows optimal collocations to be selected. In the case where there are two or more candidates for the correct collocation and the candidates all contain the same word, this technique allows the correct candidate to be selected with improved reliability.

These methods and apparatuses are generally performed by or embodied by a programmed data processor such as a computer. The technique is computationally economical and requires much less computing time and resources than the known parsing technique. For instance, this technique allows optimal collocation selection in a time of the order of (n log n) (where n is the number of equivalences before sorting as described hereinafter), whereas parsing requires a time of the order of $n^3$. Although continuous collocation detection requires a time of the order of n, it cannot distinguish between collocations of the same length (as mentioned hereinafter) and gives poor results.

BRIEF DESCRIPTION OF THE DRAWINGS

The invention will be further described, by way of example, with reference to the accompanying drawings, in which.

DETAILED DESCRIPTION OF THE INVENTION

Figure 1:
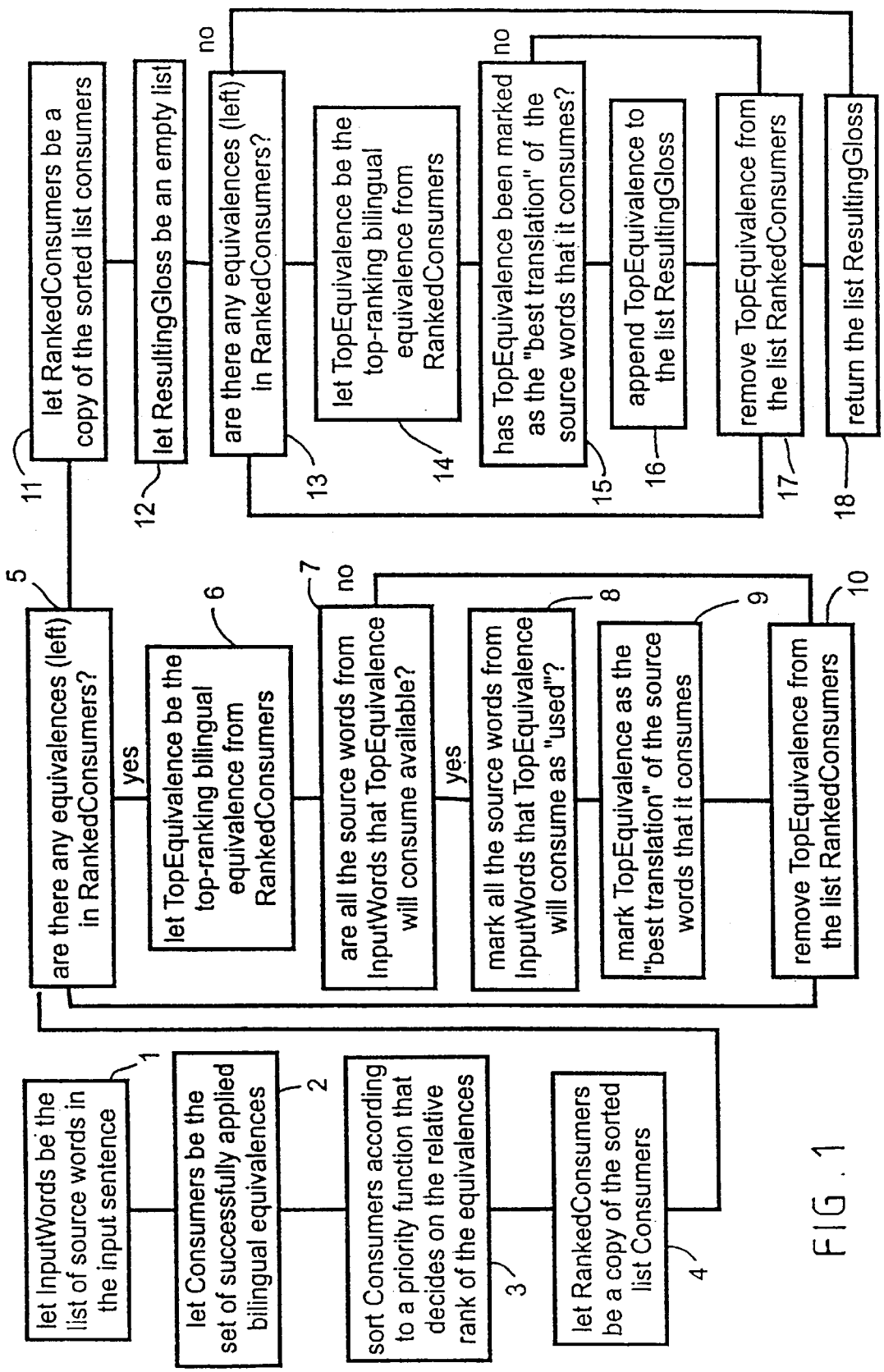
FIG. 1 is a flow diagram illustrating a method of processing an input text constituting a first embodiment of the invention.

The method illustrated in FIG. 1 represents a glossing system which provides an approximate translation of input text in a first language to a second language (such as from English to Dutch, as described hereinafter) by annotating an analysis of the input text on a sentence-by-sentence basis with translations of words and collocations. The method makes use of a bilingual machine-readable dictionary containing bilingual equivalences eg. words or collocations in one language which are equivalent in meaning and part of speech to words or collocation in another language. In order to find an optimal "gloss" or gloss translation of the words and collocations, it is necessary to select between equivalences competing for the same word or group of words in the input sentence ie. different collocations which have one or more of the words of the sentence in common. In the method, bilingual equivalences may be thought of as "consumers" competing for a resource ie. the right to use a word as part of a translation (there can only be one best correct translation). It is assumed that every equivalence carries enough information with it in order to decide whether it has the right to lock or claim a resource. Competing consumers are compared in order to decide which have priority. In order to support this technique, it is necessary to associate with every translation a "justification" ie. the source items and derivation methods from which the target item was derived.

In step 1 of FIG. 1, a list is formed of the source words in the input sentence and is assigned a name InputWords. The source words may be the actual words appearing in the sentence. Alternatively, the source words may be basic word forms derived from the sentence by morphological analysis. For instance, each word may be given a tag to indicate its part of speech, candidates for verbs may be reduced to the infinitive form and optionally tagged with their tense, and nouns may be made singular with a tag to indicate singular or plural. Where a word may exist as different parts of speech, the list includes multiple occurrences of the word, each tagged with a respective possible part of speech. For instance, the word "stop" may be a noun or a verb and would therefore appear twice in InputWords, for instance as "stop (n)" and "stop(v)".

In step 2, the set Consumers is derived as the set of successfully applied bilingual equivalences. Each of the words of InputWords is used to access the bilingual equivalences (equivalent to bilingual dictionary entries) and each bilingual equivalence in which that word appears is selected. If the bilingual equivalence comprises a collocation, it is selected only if all words of the collocation are present in InputWords.

In step 3, the Consumers are sorted according to a priority function which decides on the relative rank or priority value of the equivalences. There are several techniques for assigning the relative rank or priority value and some depend at least partly on the nature of the language of the input text. Two examples are described hereinafter.

In the first example, several criteria are used to assign the relative rank or priority value to the Consumers. These criteria apply to English and some or all of the criteria apply to other languages. The criteria are:

baggability;
compactness;
reading score;
rightmostness; and
defaultness.

"Baggability" is the number of source words consumed by an equivalence and represents the cardinality of the justifications. For instance, in the sentence fragment:

" . . . make up for lost time . . . "

the collocation "make up for" (compensate) is assigned a higher relative rank or priority value than the collocation "make up" (reconcile) because the former collocation consumes three source words whereas the latter collocation consumes two source words. This is based on the feature of many languages including English that a collocation of more words is more likely to be the optimal or correct collocation. These specific examples are collocations of adjacent words but the same principle applies to discontinuous collocations ie. words which form a collocation but which are separated by words not in the collocation in the input sentence.

"Compactness" gives a higher relative rank or priority value to collocations of smaller span ie. the number of words including the words of the collocation between the first or left-most word and the last or right-most word of the collocation in the input sentence. In the sentence fragment:

" . . . get something to eat . . . "

there are two collocations each of two words, namely "something to" and "get to". The span of "something to" is two words whereas the span of "get to" is three words. The baggability criterion cannot distinguish the relative rank or priority value of collocations of the same cardinality or number of words but the compactness criterion assigns a higher relative rank or priority value to collocations of smaller span. Thus, the compactness criterion chooses the collocation "something to" on the intuitive principle that collocations whose words are closer together are more likely to be appropriate. In general, the compactness criterion is applied if the baggability criterion cannot assign different relative ranks or priority values to all of the collocations ie. there are several collocations of the same numbers of words.

The "reading score" criterion prefers the more likely parts-of-speech as established, for instance, by the preliminary morphological analysis or by a tagging algorithm or routine. For instance, there are two collocations of the form "way_N to", where "to" is either the infinitival particle (for instance, in "the way to do it") or a preposition (for instance, in "the way to London"). Thus, the words in the neighbourhood of the collocation, for instance immediately to the right or left of the collocation in the input sentence, indicate the more likely reading in this type of case. In one of the above examples, the collocation "way_N to" is immediately before the word "London", which is a noun. Thus, the preposition use of "to" is indicated and the correct collocation can be identified. Different probabilities to the two readings can be assigned depending on the following word and the reading score criterion uses this information to chose the more likely collocation.

The "rightmostness" criterion refers to how far to the right in the input sentence an expression occurs. For instance, in the sentence fragment:

" . . . stop operating systems crashing . . . "

"stop operating" and "operating systems" are collocations. They have identical baggability and compactness but "operating systems" occurs further to the right. Thus, if the previous criteria have been unable to distinguish between competing candidates for the optimal collocation, the right-most expression is selected on the grounds that certain languages such as English tend to be right-branching. However, for other languages such as Japanese which are left-branching, the rightmostness criterion is not applicable and may be omitted or replaced by a leftmostness criterion.

"Defaultness" refers to whether a collocation is selected by default. This is the only one of the five criteria listed hereinbefore which is heuristic and involves semantics. All other things being equal, the most common collocation should apply by default.

In the second example, the assigning of relative rank or priority value to equivalences which are collocations is based on a single unified measure of probability that each collocation applies. This differs from the previous five criteria in that it is based on prior analyses of large amounts of text in the source language to establish the probabilities. Such data may be stored as a look-up table to which the step 3 refers by indexing with each word of a collocation.

In the case of a two word collocation such as the English phrasal verb "make up", all the instances where these two words appear in this order in a sentence are collected. Each occurrence is classified for whether it is a positive or negative instance of this collocation (in any sense) and, from this, a frequency distribution $f_{make\_up}(d)$ over the number of words separating the elements of this collocation can be plotted. This may be represented as: $f_{make\_up}(d)$: make_ V<d>up_APART. If probability distributions $t_{make}$ and $t_{up}$ have been assigned to the two elements in the sentence, the probability that the left-hand side matches a collocation of the form "make . . . $_n$UP" where the words "make" and "up" are separated by n words is:

$t_{make}(v) \cdot t_{up}(APART) \cdot f_{makeup}(n)$.

In other words, the probability is the product of the three probabilities: that "make" is a verb; that "up" is an adverbial particle; and that they are collocated at this separation.

In the case of the five criteria of the first example as described hereinbefore, the priority values of the equivalences are always unique ie. two equivalences can never have the same priority value, so that relative rank is equivalent to relative priority value. In the case of the second example based on probability measures, it is possible for two (or more) equivalences to have the same probability and hence the same priority value. Because subsequent method steps rely on unambiguous "ordering" of the equivalences, equivalences having the same priority value must be distinguished so as to provide unambiguous ranking and this may be achieved by arbitrarily ascribing different but adjacent relative ranks to such equivalences. In this case, therefore, the relative rank is not wholly equivalent to the priority value.

In step 4, the list of Consumers sorted in the step 3 is copied and then entitled RankedConsumers. Step 5 tests whether there are any equivalences in or left in RankedConsumers. If so, step 6 assigns the top ranked or highest priority bilingual equivalence from RankedConsumers to TopEquivalence. Step 7 tests whether all the source words from InputWords that TopEquivalence will consume are available. In other words, the step 7 tests whether all the source words in TopEquivalence are still unused or unconsumed. If so, step 8 marks all of the source words from InputWords that TopEquivalence will consume as "used" and step 9 marks TopEquivalence the "best translation" of the source words that it consumes. Step 10 then removes TopEquivalence from the list RankedConsumers following the step 9 or following the step 7 if the test of the step 7 was negative. Control then returns to the step 5 until there are no equivalences left in RankedConsumers.

Step 11 is the same as the step 4 and copies the sorted list of Consumers as RankedConsumers. Step 12 resets ResultingGloss to be an empty list and step 13 determines whether there are any equivalences in or left in RankConsumers. If so, step 14 sets TopEquivalence to the top-ranking or highest priority bilingual equivalence from RankedConsumers. Step 15 tests whether TopEquivalence has been marked as the "best translation" of the source words that it consumes. If so, step 16 appends TopEquivalence to the list ResultingGloss. Step 17 removes TopEquivalence from the list RankedConsumers and follows the step 16 or the step 15 if the result of the test of the step 15 was negative. The steps 13 to 17 are repeated until there are no equivalences left in the RankedConsumers. Step 18 then returns the list ResultingGloss as a bilingual equivalent or gloss translation of the input sentence.

The complexity, for instance in terms of computational time or requirements, of this technique may be assessed as follows. Each bilingual equivalence is indexed by choosing the least frequent word as a key. All bilingual equivalences indexed by all words in the input sentence are retrieved. The retrieval operations or steps may be assumed to take substantially the same time. If there are n equivalences, being simple rules, their application is order n (the cost of applying an equivalence is regarded as constant as it does not vary with the sentence length or number of equivalences). The technique illustrated in FIG. 1 is fundamentally a sorting technique so that the overall complexity is of the order of (n log n).

This technique does not guarantee to tile fully the input sentence unless the glossing is arranged to perform "greedy tiling". If greedy or full tiling is desired, a tractable solution is to guarantee that every word has at least one bilingual equivalence with a single word key. For glossing, this is not necessary and may not even be desirable because it is not always useful to have translations of every word. Further, unless it can be guaranteed that every bilingual equivalence is correct as opposed to simply present and the set of keys is complete, it cannot be guaranteed that a tiling will make any sense. It is pointless to make the complete tessellation of a sentence paramount if this results in worse translation quality and efficiency.

The following example illustrates the use of the method shown in FIG. 1 to generate a gloss Dutch translation of an English sentence. For the purposes of illustration, the following English sentence is used as input to the system:

"Air passes out of the furnace through a tap."

As a preliminary step, the sentence is subjected to a preliminary tagging and morphological analysis to generate for every word in the sentence a list of morphological readings which might apply to the word. For instance, this may be performed by the technique disclosed in GB 2 314 183 and EP 0 813 160. The members of the list are then applied to the bilingual equivalences ie. the English side of a bilingual English-Dutch dictionary is accessed by each of the possible words and collocations. This corresponds to the step 2 of FIG. 1. The equivalences which are successfully accessed are listed as follows:

| | | |
|---|---|---|
| !a__DET | ⇆ | \<null translation\> |
| a__DET | ⇆ | een |
| air__N | ⇆ | lucht |
| air__V | ⇆ | luchten |
| furnace__N | ⇆ | oven |
| out__N | ⇆ | uit |
| out__V | ⇆ | uiten |
| out\<1\> of | ⇆ | uit |
| pass__N | ⇆ | pasje |
| pass__V | ⇆ | leiden |
| pass__\<4\>out | ⇆ | uitleiden |
| pass\<4\>through | ⇆ | doorvoeren |
| tap__N | ⇆ | kraan |
| tap__V | ⇆ | tappen |
| the__DET | ⇆ | \<null translation\> |
| through__PREP | ⇆ | door |

These equivalences are ordered using the five criteria described hereinbefore. For instance, baggability prefers "pass\<4\>out" over "pass" because the former consumes more words than the latter. The notation "pass\<4\>out" means than "pass" and "out" may only be considered as a collocation if the word "out" is less than or equal to four words to the right of "pass" in the input sentence.

In the case of collocations of the same baggability, the compactness criterion applies so that the collocation "pass\<4\>out" is preferred to "pass\<4\>through" because the span of the former (2) is less than the span of the latter (6).

Where the baggability and compactness criteria fail to separate the rank or priority value of two collocations, such as "out\<1\>of" and "pass\<4\>out", the rightmostness criterion is applied. Because "out\<1\>of" is to the right of "pass\<4\>out" in the input sentence, the former collocation is given the higher rank or priority value.

If two equivalences have the same rank or priority value based on all the previous criteria, a default translation (indicated by a "!" flag) is preferred. In the list of equivalences for this input sentence, the equivalence "a⇆\<null translation\>" is preferred over "a⇆een".

Using these criteria, the equivalences are sorted in order of rank or priority value as follows (this corresponds to the step 3 in FIG. 1):

| | | |
|---|---|---|
| out\<1\>of | ⇆ | uit |
| pass\<4\> out | ⇆ | uitleiden |
| pass\<4\>through | ⇆ | doorvoeren |

-continued

| | | |
|---|---|---|
| tap_N | ⇆ | kraan |
| tap_V | ⇆ | tappen |
| !a_DET | ⇆ | <no translation> |
| a_DET | ⇆ | een |
| through_PREP | ⇆ | door |
| furnace_N | ⇆ | oven |
| the_DET | ⇆ | <no translation> |
| out_N | ⇆ | uit |
| out_V | ⇆ | uiten |
| pass_N | ⇆ | pasje |
| pass_V | ⇆ | leiden |
| air_N | ⇆ | lucht |
| air_V | ⇆ | luchten |

These equivalences are then applied to the input sentence in order of decreasing rank or priority value (the step 6 of FIG. 1) so as to generate a gloss translation. As described hereinbefore, the source words in the input sentence may be considered as resources which are consumed by the application of an equivalence. As a result of this consumption, a target language translation is attached to the source words.

Thus, the first equivalence "out<1>of" is applied first and consumes the source words "out" and "of" (consumed words are denoted by bold typeface) while attaching the Dutch translation:

| Air passes out of the furnace through a tap |
|---|
| uit |

In the next step, the equivalence "pass<4>out" is applied but is rejected because the source word "out" has already been consumed. The equivalence "pass<4>through" is successfully applied to give:

| Air passes out of the furnace through a tap |
|---|
| doorvoeren uit |

Each of these steps corresponds to the steps 5 to 17 in FIG. 1. This process continues until all of the equivalences have been applied and all of the source words have been consumed. This results in a gloss translation of the whole sentence as follows:

| Air passes out of the furnace through a tap |
|---|
| lucht doorvoeren uit oven kraan |

Figure 2:
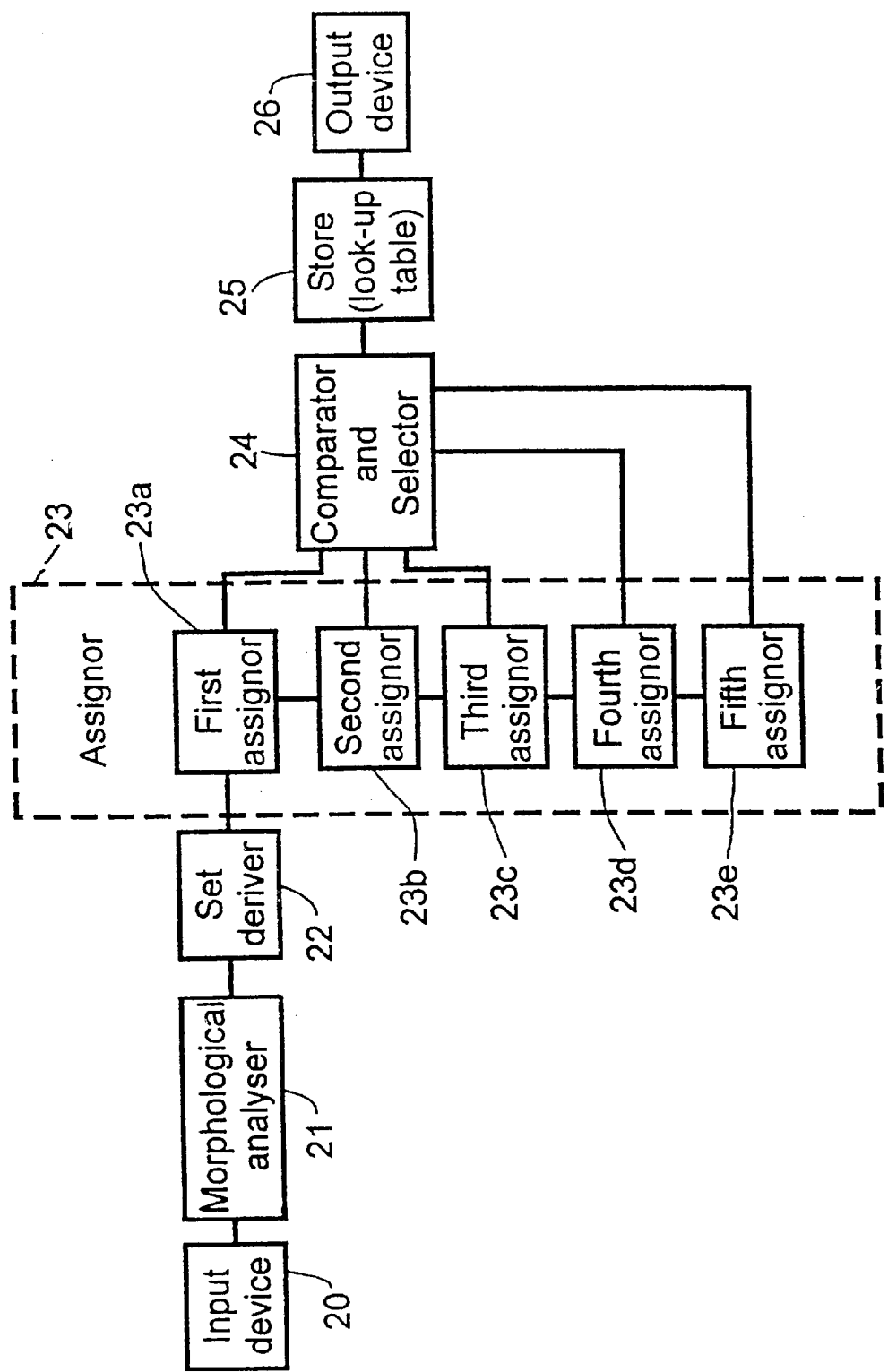
FIG. 2 is a block schematic diagram of an apparatus constituting a second embodiment of the invention.

FIG. 2 illustrates an apparatus which is suitable for performing a method of the type illustrated in FIG. 1. The apparatus may be embodied as dedicated hardware of any suitable type but will normally be embodied as a programmed data processor or computer.

The apparatus comprises an input device 20 for receiving input text to be processed and for supplying to the remainder of the apparatus samples of the text, such as sentences, one at a time for processing. A morphological analyser 21 performs morphological analyses of the sentence and a set deriver 22 derives sets of words, for instance in the form of basic word forms, where each set comprises one or more words. An assignor 23 then assigns a relative rank or priority value to each of the sets derived by the set deriver 22.

The assignor 23 comprises first to fifth assignors 23a to 23e, respectively, whose outputs are connected to a comparator and selector 24. For instance, the first assignor 23a applies the baggability criterion and supplies to the comparator and selector 24 those sets having unique priority values. Sets which cannot be distinguished by this criterion are supplied to the second assignor 23b, which applies the compactness criterion. Those sets whose priority values can be distinguished by this criterion are supplied to the comparator and selector 24 whereas those sets whose priority values still cannot be separated are supplied to the third assignor 23c. The third assignor 23c applies the reading score criterion to separate the priority values of the sets and supplies these to the comparator and selector 24. Similarly the fourth and fifth assignors 23d and 23e apply the rightmostness and default criteria, respectively, to sets whose priority values could not be separated by the upstream assignors. Alternatively, the assignor 23 may be arranged to determine relative rank on the basis of probability measures as described hereinbefore.

The comparator and selector 24 compares each set in order of decreasing priority value with the input text and selects each set, all of whose words are present in the input text and none of whose words is present in a previously selected set of higher priority value. When the comparator and selector 24 has finished selecting sets, these sets are applied as input to a look-up table contained in a store 25 of bilingual equivalences. The resulting translations, with or without the corresponding sets of words annotated in the input sentence, are supplied to an output device 26, such as a visual display unit, printer, or memory.

Figure 3:
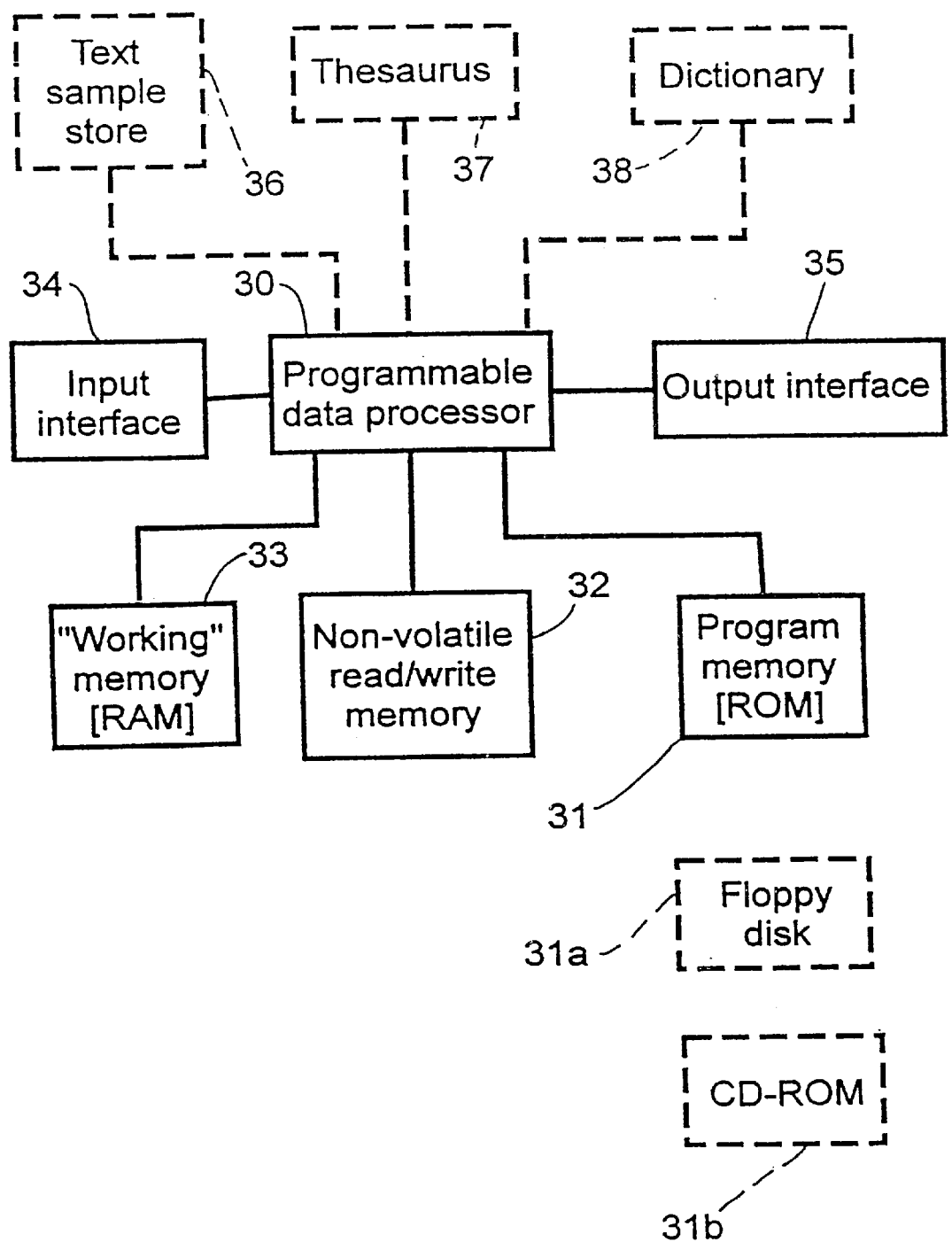
FIG. 3 is a block schematic diagram of a programmable data processor-based apparatus constituting a third embodiment of the invention.

FIG. 3 illustrates a programmable system suitable for embodying the apparatus illustrated in FIG. 2 and for performing the method illustrated in FIG. 1. The system comprises a programmable data processor 30 with a program memory 31, for instance in the form of a read only memory ROM, storing a program for controlling the data processor 30 to perform, for example, the method illustrated in FIG. 1. The system further comprises non-volatile read/write memory 32 for storing, for example, any data which must be retained in the absence of power supply. A "working" or "scratchpad" memory for the data processor is provided by a random access memory (RAM) 33. An input interface 34 is provided, for instance for receiving commands and data. An output interface 35 is provided, for instance for displaying information relating to the progress and result of the method.

A text sample may be supplied via the input interface 34 or may optionally be provided by a machine-readable store 36. A thesaurus 37 and/or a dictionary 38 may be accessed by the data processor 30. For instance, in order to perform the method of glossing translation illustrated in FIG. 1, the dictionary 38 may comprise a bilingual dictionary.

The program for operating the system and for performing the method described hereinbefore is stored in the program memory 31, which may be embodied as a semi-conductor memory, for instance of the ROM type as described hereinbefore. However, the program may be stored in any other suitable-storage medium, such as floppy disc 31a or CD-ROM 31b.

Although the method and apparatus have been described for performing glossing translation, these techniques may be used for other applications. For instance, these techniques may be used in any system which performs indexing using words or which requires lightweight shallow parsing. For instance, these techniques may be used for indexing and querying using collocations in information retrieval systems. Also, such techniques may be used in dictionary-based systems.

What is claimed is:

1. A method of processing an input text comprising a plurality of words, the method comprising the steps of:
   deriving from the input text a plurality of sets such that each set comprises at least one of the words of the input text, all of the words of each set are present in the input text, and the words of each if any set containing more than one word constitute a collocation;
   assigning to each set a unique relative rank;
   comparing each set in order of decreasing relative rank with the input text; and
   selecting each set, all of whose words are present in the input text and none of whose words is present in a previously selected set of higher relative rank.

2. A method as claimed in claim 1, wherein each of the words of the input text is present in at least one of the sets.

3. A method as claimed in claim 1, wherein all of the words of the input text are present in the union of the selected sets.

4. A method as claimed in claim 1, wherein the input text comprises a grammatically complete sample of text.

5. A method as claimed in claim 1, wherein the words comprise basic word forms derived from an original text by linguistic analysis in a preliminary step.

6. A method as claimed in claim 1, wherein the assigning step comprises a first step of assigning a priority value which increases with increasing number of words in the set.

7. A method as claimed in claim 1, wherein the assigning step comprises a second step of assigning a priority value which decreases with increasing span of the words of the set in the input text.

8. A method as claimed in claim 6 wherein the assigning step comprises a second step of assigning a priority value which decreases with increasing span of the words of the set in the input text, wherein the second step is performed only if the first step results in more than one set having the same priority value.

9. A method as claimed in claim 1, wherein the assigning step comprises a third step of assigning a priority value which is dependent on the linguistic relationship between at least one word of the set and at least one word of the input text not in the set.

10. A method as claimed in claim 7, wherein the assigning step comprises a third step of assigning a priority value which is dependent on the linguistic relationship between at least one word of the set and at least one word of the input text not in the set, wherein the third step is performed only if the second step results in more than one set having the same priority value.

11. A method as claimed in claim 1, wherein the assigning step comprises a fourth step of assigning a priority value which increases with position to the right in the input text of the right-most word of the set.

12. A method as claimed in claim 9, wherein the assigning step comprises a fourth step of assigning a priority value which increases with position to the right in the input text of the right-most word of the set, wherein the fourth step is performed only if the third step results in more than one set having the same priority value.

13. A method as claimed in claim 1, wherein the assigning step comprises a fifth step of assigning priority value by default.

14. A method as claimed in claim 11, wherein the assigning step comprises a fifth step of assigning priority value by default, wherein the fifth step is performed only if the fourth step results in more than one set having the same priority value.

15. A method as claimed in claims 1, wherein the assigning step comprises assigning a priority value based on a measure of probability for each set.

16. A method as claimed in claim 1, further comprising accessing an index of word sets with at least one of the selected sets.

17. An apparatus for processing an input text comprising a plurality of words, the apparatus comprising:
    means for deriving from the input text a plurality of sets such that each set comprises at least one of the words of the input text, all of the words of each set are present in the input text, and the words of each if any set containing more than one word constitute a collocation;
    means for assigning to each set a unique relative rank;
    means for comparing each set in order of decreasing relative rank with the input text; and
    means for selecting each set, all of whose words are present in the input text and none of whose words is present in a previously selected set of higher relative rank.

18. An apparatus as claimed in claim 17, wherein the deriving means is arranged such that each of the words of the input text is present in at least one of the sets.

19. An apparatus as claimed in claim 17, wherein the selecting means is arranged such that all of the words of the input text are present in the union of the selected sets.

20. An apparatus as claimed in claim 17, wherein the input text comprises a grammatically complete sample of text.

21. An apparatus as claimed in claim 17, wherein the words comprise basic word forms and the apparatus comprises a linguistic analyzer for analyzing an original text and providing the basic word forms.

22. An apparatus as claimed in claim 17, wherein the assigning means comprises first means for assigning a priority value which increases with increasing number of words in the set.

23. An apparatus as claimed in claim 17, wherein the assigning means comprises second means for assigning a priority value which decreases with increasing span of the words of the set in the input text.

24. An apparatus as claimed in claim 22, wherein the assigning means comprises second means for assigning a priority value which decreases with increasing span of the words of the set in the input text, wherein the second means is enabled only if the first means assigns the same priority value to more than one set.

25. An apparatus as claimed in claim 17, wherein the assigning means comprises third means for assigning a priority value which is dependent on the linguistic relationship between at least one word of the set and at least one word of the input text not in the set.

26. An apparatus as claimed in claim 23, wherein the assigning means comprises third means for assigning a priority value which is dependent on the linguistic relationship between at least one word of the set and at least one word of the input text not in the set, wherein the third means is enabled only if the second means assigns the same priority value to more than one set.

27. An apparatus as claimed in claim 17, wherein the assigning means comprises fourth means for assigning a priority value which increases with position to the tight in the input text of the right-most word of the set.

28. An apparatus as claimed in claim 25, wherein the assigning means comprises fourth means for assigning a priority value which increases with position to the right in the input text of the right-most word of the set, wherein the fourth means is enabled only if the third means assigns the same priority value to more than one set.

29. An apparatus as claimed in claim 17, wherein the assigning means comprises a fifth means for assigning a priority value by default.

30. An apparatus as claimed in claim 27, wherein the assigning means comprises a fifth means for assigning a priority value by default, wherein the fifth means is enabled only if the fourth means assigns the same priority value to more than one set.

31. An apparatus as claimed in claim 17, wherein the assigning means is arranged to assign a priority value based on a measure of probability for each set.

32. An apparatus as claimed in claim 17, further comprising a store containing an index of word sets and means for accessing the index with at least one of the selected sets.

33. An apparatus as claimed in claim 17, further comprising a programmed data processor.

34. A storage medium containing a program for a data processor of an apparatus as claimed in claim 33.

35. A method of performing an approximate translation of an input text in a first natural language to a second natural language, comprising performing a method as claimed in claim 16, wherein the index is a dictionary, and outputting dictionary entries in the second language corresponding to the selected sets.

36. An apparatus for performing approximate translation from an input text in a first natural language to a second natural language, comprising an apparatus as claimed in claim 32, the store containing entries constituting a dictionary.

* * * * *